US012173475B2

(12) United States Patent
Hoshino et al.

(10) Patent No.: US 12,173,475 B2
(45) Date of Patent: Dec. 24, 2024

(54) WORK MACHINE

(71) Applicant: Hitachi Construction Machinery Co., Ltd., Tokyo (JP)

(72) Inventors: Masatoshi Hoshino, Tsuchiura (JP); Seiji Hijikata, Tsukuba (JP); Yasutaka Tsuruga, Ryugasaki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 18/025,085

(22) PCT Filed: Dec. 15, 2021

(86) PCT No.: PCT/JP2021/046387
§ 371 (c)(1),
(2) Date: Mar. 7, 2023

(87) PCT Pub. No.: WO2022/180997
PCT Pub. Date: Sep. 1, 2022

(65) Prior Publication Data
US 2023/0323634 A1 Oct. 12, 2023

(30) Foreign Application Priority Data
Feb. 25, 2021 (JP) ................................ 2021-028971

(51) Int. Cl.
*E02F 9/22* (2006.01)
*E02F 9/20* (2006.01)
(Continued)

(52) U.S. Cl.
CPC .......... *E02F 9/2203* (2013.01); *E02F 9/2004* (2013.01); *E02F 9/2296* (2013.01);
(Continued)

(58) Field of Classification Search
CPC ..... E02F 9/2203; E02F 9/2296; E02F 9/2285; E02F 9/2235; E02F 9/2228; E02F 9/2004; F15B 13/0424
See application file for complete search history.

(56) References Cited

FOREIGN PATENT DOCUMENTS

| | | |
|---|---|---|
| JP | 7-139510 A | 5/1995 |
| JP | 3828680 B2 | 10/2006 |

(Continued)

OTHER PUBLICATIONS

International Preliminary Report on Patentability (PCT/IB/338 & PCT/IB/373) issued in PCT Application No. PCT/JP2021/046387 dated Sep. 7 2023, including English translation of document C2 (Japanese-language Written Opinion (PCT/ISA/237), filed on Mar. 7, 2023) (6 pages).

(Continued)

*Primary Examiner* — Kenneth Bomberg
*Assistant Examiner* — Daniel S Collins
(74) *Attorney, Agent, or Firm* — Crowell & Moring LLP

(57) ABSTRACT

The object of the invention of the present application resides in provision of a work machine that can be improved in operability at start of an action of a hydraulic actuator in a fine operation in which an operation lever is operated by a small amount. To this end, on the basis of a signal from a first timing sensor and a signal from a second timing sensor, a machine body controller controls, before the first timing is sensed, the pump delivery flow rate to a minimum delivery flow rate, controls, after the first timing is sensed but before the second timing is sensed, the pump delivery flow rate to a predetermined delivery flow rate that is greater than the minimum delivery flow rate, and controls, after the second timing is sensed, the pump delivery flow rate to a delivery flow rate according to an operation amount of the operation lever.

3 Claims, 11 Drawing Sheets

(51) Int. Cl.
*F15B 13/044* (2006.01)
*F15B 15/26* (2006.01)

(52) U.S. Cl.
CPC ............ *F15B 13/044* (2013.01); *F15B 15/26* (2013.01); *E02F 9/2285* (2013.01); *E02F 9/2292* (2013.01); *F15B 2211/426* (2013.01)

(56) References Cited

FOREIGN PATENT DOCUMENTS

| | | | |
|---|---|---|---|
| JP | 2014-55635 | A | 3/2014 |
| JP | 2015-209943 | A | 11/2015 |
| JP | 2019-44933 | A | 3/2019 |

OTHER PUBLICATIONS

International Search Report (PCT/ISA/210) issued in PCT Application No. PCT/JP2021/046387 dated Mar. 15, 2022 with English translation (four (4) pages).
Japanese-language Written Opinion (PCT/ISA/237) issued in PCT Application No. PCT/JP2021/046387 dated Mar. 15, 2022 (four (4) pages).

WORK MACHINE

TECHNICAL FIELD

The present invention relates to operability of a work machine such as a hydraulic excavator.

BACKGROUND ART

As a work machine such as a hydraulic excavator, a work machine which is configured such that a pump is driven by an engine and hydraulic operating fluid delivered from the pump is supplied to a hydraulic actuator is available. A directional control valve is interposed between the pump and the hydraulic actuator and adjusts the direction and the flow rate of hydraulic fluid that is to flow into the hydraulic actuator. The pump is a variable displacement pump whose capacity is controllable and can adjust the flow rate of the hydraulic fluid that flows into the directional control valve.

In a hydraulic system of the open center type, the directional control valve adjusts the area of a meter-in opening for introducing hydraulic fluid from the pump to the hydraulic actuator and a bleed-off opening for returning the hydraulic fluid to a hydraulic operating fluid tank.

When the hydraulic actuator is not operated, the meter-in opening is closed while the bleed-off opening is opened. Therefore, the whole amount of the hydraulic operating fluid delivered from the pump returns to the hydraulic operating fluid tank. At this time, in order to reduce the fuel consumption, the capacity of the pump is minimized to reduce the delivery flow rate.

When the hydraulic actuator is caused to act, the meter-in opening increases while the bleed-off opening decreases, according to the magnitude of the action. At the same time, also the pump adjusts the delivery flow rate according to the magnitude of the action. Consequently, the pump supplies a flow rate necessary for a work to the directional control valve and suppresses a useless flow rate to prevent increase in the pressure loss and the bleed-off flow rate that cause fuel consumption degradation.

An operator adjusts the opening area described above and the flow rate (pump delivery flow rate) to be delivered from the pump, by the operation amount of an operation lever, and performs such a work as leveling or excavation.

In a work that requires a fine operation, the operation amount of the operation lever is small, and therefore, the flow rate (meter-in flow rate) of hydraulic fluid flowing to the meter-in side of the hydraulic actuator and the pump delivery flow rate are small. However, in a work in which it is necessary to operate the operation lever at a very low speed by a very small amount, even if the capacity of the pump is set to the minimum, the pump delivery flow rate becomes excessive from a point of view of the operability, which sometimes has an influence on the operability.

Although it is possible at this time to reduce the engine speed to further decrease the pump delivery flow rate, it is cumbersome for the operator to adjust the engine speed according to a work. Further, if the engine speed is decreased, then the flow rate to be supplied to all hydraulic actuators decreases uniformly, and there is a case in which the operability decreases when a plurality of hydraulic actuators are caused to act at the same time or in a like case.

In order to solve this problem, in Patent Document 1, a flow control valve capable of connecting, to a hydraulic operating fluid tank, the bottom side and the rod side of a hydraulic cylinder that is a hydraulic actuator is provided such that, in a fine operation region in which the operation lever is operated by a small amount, part of the pump delivery flow rate is returned to the hydraulic operating fluid tank. Consequently, when the pump delivery flow rate is minimized, the meter-in flow rate can be made lower than the minimum pump delivery flow rate, and the operability in a fine operation is improved.

PRIOR ART DOCUMENT

Patent Document

Patent Document 1: JP-3828680-B

SUMMARY OF THE INVENTION

Problem to be Solved by the Invention

However, with this method, it is difficult to improve behavior of the hydraulic actuator when the hydraulic actuator starts to act from a standstill state.

Since the operation lever is moved slowly at the start of movement of a fine operation, the pump delivery flow rate increases slowly as well. Although, in a state in which the hydraulic actuator is inoperative, the thrust force by a holding pressure of the cylinder and the gravity are balanced, in order for the hydraulic actuator to start to act, it is further necessary for the thrust force to exceed the friction force of a sliding portion of the cylinder. In general, the friction force of the sliding portion is in the maximum in a standstill state (static friction), decreases abruptly after the hydraulic actuator starts to act, and then turns to increase if the speed further increases. At comparatively sharp start of movement in a normal work, the hydraulic actuator acts promptly in a region in which the friction force is comparatively small. However, if the thrust force is increased slowly by a fine operation, then the hydraulic actuator comes to act in a region in which the speed of it increases and the friction force changes abruptly. Therefore, there is case in which the response of the hydraulic actuator is delayed with respect to the operation amount of the lever and the rise of the speed becomes steep. As a result, there is the possibility that a dispersion may occur with the timing at which the hydraulic actuator starts to act or with the rise of the speed of the hydraulic actuator, resulting in impairment of the operability in a fine operation.

Therefore, it is an object of the present invention to provide a work machine that can be improved in operability at the start of an action of a hydraulic actuator in a fine operation in which an operation lever is operated by a small amount.

Means for Solving the Problem

In order to achieve the object described above, according to the present invention, there is provided a work machine that includes a hydraulic pump of the variable displacement type, a hydraulic actuator driven by hydraulic fluid supplied from the hydraulic pump, an operation lever for issuing an instruction of an action of the hydraulic actuator, and a controller that controls a pump delivery flow rate that is a delivery flow rate of the hydraulic pump, the work machine including a first timing sensor for sensing a first timing that is a timing immediately before the hydraulic actuator starts to act, and a second timing sensor for sensing a second timing that is a timing immediately after the hydraulic actuator starts to act. The controller, on the basis of a signal from the first timing sensor and a signal from the second timing sensor, controls, before the first timing is sensed, the pump delivery flow rate to a minimum delivery flow rate, controls, after the first timing is sensed but before the second timing is sensed, the pump delivery flow rate to a predetermined delivery flow rate that is greater than the minimum delivery flow rate, and controls, after the second timing is sensed, the pump delivery flow rate to a delivery flow rate according to an operation amount of the operation lever.

With the present invention configured in such a manner as described above, the delivery flow rate of the hydraulic pump (pump delivery flow rate) is controlled to the predetermined delivery flow rate greater than the minimum delivery flow rate during the period from a timing immediately before the hydraulic actuator starts to act (first timing) to a timing immediately after the hydraulic actuator starts to act (second timing). Therefore, the thrust force at the start of the action of the hydraulic actuator rapidly surpasses the static friction force of a sliding portion of the hydraulic actuator. Consequently, the dispersion of the timing of the start of the action and the rise of the speed of the hydraulic actuator is suppressed. Therefore, the operability at the start of the action of the hydraulic actuator can be improved in a fine operation in which the operation lever is operated by a small amount.

Advantages of the Invention

With the work machine according to the present invention, the operability at the start of an action of the hydraulic actuator can be improved in a fine operation in which the operation lever is operated by a small amount.

MODES FOR CARRYING OUT THE INVENTION

First Embodiment

Figure 1:
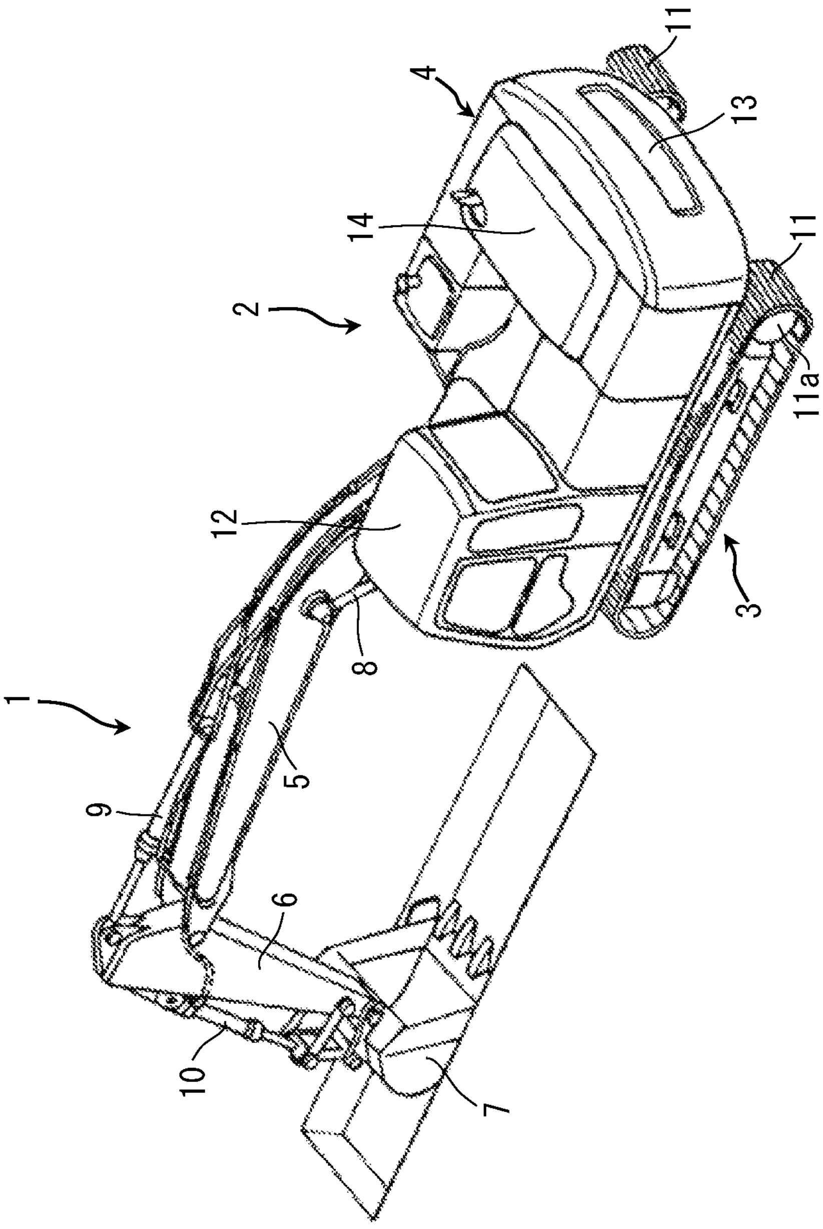
FIG. 1 is a perspective view depicting a hydraulic excavator according to a first embodiment of the present invention.

In the following, an embodiment of the present invention is described with reference to the drawings. The present embodiment is described taking a hydraulic excavator as an example of a work machine. It is to be noted that, in the figures, like members are denoted by like reference characters, and overlapping description of them is omitted suitably.

Embodiment 1

A configuration of a hydraulic excavator according to a first embodiment of the present invention is described with reference to FIG. 1. FIG. 1 is a perspective view depicting the hydraulic excavator according to the present embodiment. Here, the description is given using directions as viewed from an operator sitting on a driver seat of the hydraulic excavator.

With reference to FIG. 1, the hydraulic excavator includes a front device 1 of the articulated type for performing an excavation work and so forth and a machine body 2 to which the front device 1 is attached. The machine body 2 includes a self-propelled lower track structure 3 and an upper swing structure 4 mounted swingably on the lower track structure 3.

The front device 1 is attached rotatably in the upward-downward direction to a front portion of the upper swing structure 4. The front device 1 includes, for example, a boom 5, an arm 6, and a bucket 7 as a work tool. The boom 5 is supported on the proximal end side thereof rotatably at a front portion of the upper swing structure 4. The arm 6 is attached at a proximal end portion thereof rotatably to a distal end portion of the boom 5. The bucket 7 is attached at a proximal end portion thereof rotatably to a distal end portion of the arm 6. The boom 5, the arm 6, and the bucket 7 are driven by a boom cylinder 8, an arm cylinder 9, and a bucket cylinder 10 that are hydraulic actuators, respectively.

The lower track structure 3 includes track devices 11 of the crawler type on the left and right thereof. The left and right track devices 11 are individually driven by track hydraulic motors 11*a* (only one is depicted) that are hydraulic actuators.

The upper swing structure 4 swings with respect to the lower track structure 3 by a swing hydraulic motor (not depicted) that is a hydraulic actuator. The upper swing structure 4 includes a cab 12 installed on the left side of a front portion of a swing frame (not depicted) serving as a support structure, a counterweight 13 provided at a rear end portion of the swing frame, and a machine room 14 provided between the cab 12 and the counterweight 13. In the cab 12, a driver seat (not depicted) to be seated by an operator, operation devices 41 and 42 (refer to FIG. 2) hereinafter described, an engine control dial 43 (refer to FIG. 2), and so forth are disposed. The counterweight 13 is for adjusting the weight balance with the front device 1. The machine room

14 accommodates therein various types of equipment such as an engine 21 hereinafter described and a hydraulic pump 22 (refer to FIG. 2 hereinafter described).

The boom 5, the arm 6, the bucket 7, and the upper swing structure 4 are instructed to act by operation signals from the operation devices 41 and 42. The lower track structure 3 is instructed to act by an operation signal of an operation pedal device (not depicted).

Figure 2:
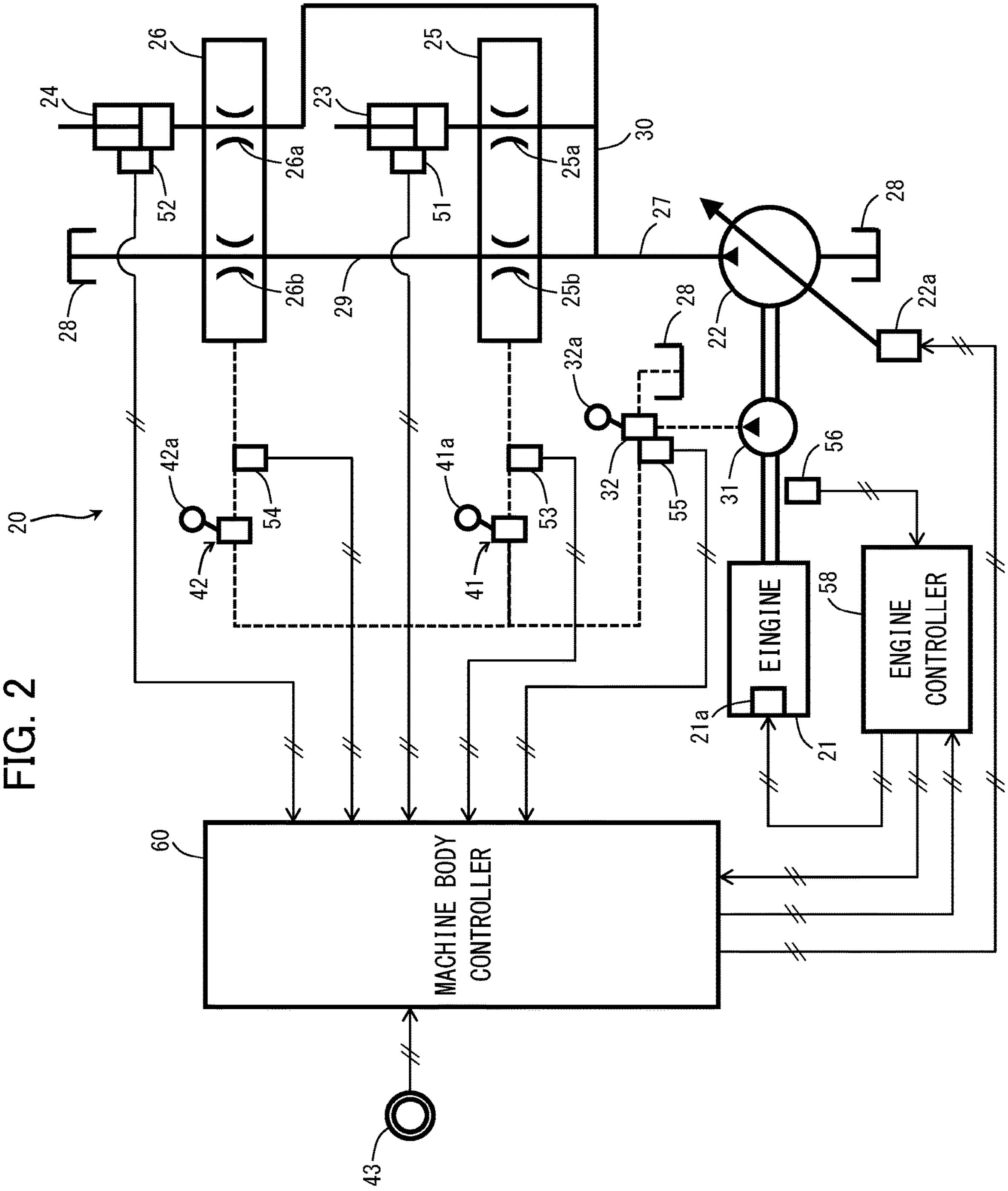
FIG. 2 is a circuit diagram depicting a configuration of main part of a hydraulic system incorporated in the hydraulic excavator according to the first embodiment of the present invention.

FIG. 2 is a circuit diagram depicting a configuration of main part of a hydraulic system incorporated in the hydraulic excavator depicted in FIG. 1.

With reference to FIG. 2, a hydraulic system 20 includes the hydraulic pump 22 and a pilot pump 31 driven by the engine 21 as a prime mover, a first hydraulic actuator 23 and a second hydraulic actuator 24 driven by hydraulic fluid delivered from the hydraulic pump 22, and a first directional control valve 25 and a second directional control valve 26 of the open center type that control a flow of hydraulic fluid (direction and flow rate) to be supplied from the hydraulic pump 22 to the first hydraulic actuator 23 and the second hydraulic actuator 24, respectively. It is to be noted that, in FIG. 2, circuit portions for driving the two hydraulic actuators are representatively extracted and depicted. Also circuit portions that drive a plurality of other hydraulic actuators not depicted in FIG. 2 are configured similarly to the circuit portions depicted in FIG. 2.

The engine 21 is mechanically coupled to rotary shafts of the hydraulic pump 22 and the pilot pump 31. The engine 21 has an injection device 21*a* for injecting fuel. The revolution speed of the engine 21 is controlled by adjustment of the fuel injection amount of the injection device 21*a* by an engine controller 58 hereinafter described.

The hydraulic pump 22 is a pump of the variable displacement type and includes a variable displacement mechanism including a swash plate or an inclined shaft. The hydraulic pump 22 includes a regulator 22*a* that adjusts the pump displacement by controlling the tilting of the swash plate or the inclined shaft of the variable displacement mechanism. The regulator 22*a* adjusts the pump displacement on the basis of a command signal from a machine body controller 60 hereinafter described. The hydraulic pump 22 is connected to the first directional control valve 25 and the second directional control valve 26 via a delivery line 27.

Each of the first hydraulic actuator 23 and the second hydraulic actuator 24 includes any one of the boom cylinder 8, the arm cylinder 9, the bucket cylinder 10, left and right track hydraulic motors 13*a* (for both, refer to FIG. 1), and the swing hydraulic motor, all of which are described above. In FIG. 2, a hydraulic cylinder is depicted exemplarily.

The first directional control valve 25 and the second directional control valve 26 of the open center type are disposed in order from the hydraulic pump 22 side toward a hydraulic operating fluid tank 28 side on a center bypass line 29 that introduces hydraulic fluid delivered from the hydraulic pump 22 to the hydraulic operating fluid tank 28. The center bypass line 29 extends in such a manner as to extend through a neutral position of the first directional control valve 25 and the second directional control valve 26, and connects the first directional control valve 25 on the upstream side and the second directional control valve 26 on the downstream side to each other by tandem connection. The center bypass line 29 is connected on one end side (upstream side) thereof to the delivery line 27 that is the delivery side of the hydraulic pump 22, and is connected on the other end side (downstream side) thereof to the hydraulic operating fluid tank 28. The first directional control valve 25 and the second directional control valve 26 are connected in parallel to the hydraulic pump 22, for example, through a hydraulic fluid supply line 30.

Each of the first directional control valve 25 and the second directional control valve 26 is a hydraulic pilot operated type valve and has a spool that moves according to the magnitude of an operation pilot pressure applied thereto. In the spools of the directional control valves 25 and 26, meter-in passages 25*a* and 26*a*, bleed-off passages 25*b* and 26*b*, and meter-out passages (not depicted) are provided, respectively. The meter-in passages 25*a* and 26*a* of the directional control valves 25 and 26 are passages for communicating the delivery line 27 with the meter-in side of the hydraulic actuators 23 and 24, respectively. The opening area of the meter-in passage 25*a*, 26*a* of the directional control valve 25, 26 is referred to as a meter-in opening area. The bleed-off passage 25*b*, 26*b* of the directional control valve 25, 26 is a passage for communicating the delivery line 27 with the center bypass line 29. The opening area of the bleed-off passage 25*b*, 26*b* of the directional control valve 25, 26 is referred to as a bleed-off opening area. The meter-out passage of the directional control valve 25, 26 is a passage for communicating the meter-out side of the hydraulic actuator 23, 24 with the hydraulic operating fluid tank 28. The opening area of the meter-out passage of the directional control valve 25, 26 is referred to as a meter-out opening area. In the directional control valve 25, 26, the ratio among the three opening areas of the meter-in opening area, the bleed-off opening area, and the meter-out opening area changes by movement of the spools. As the ratio among the three opening areas described above changes according to the spool stroke, the directional control valve 25, 26 distributes the delivery flow rate of the hydraulic pump 22 (pump delivery flow rate) to the hydraulic actuator 23, 24 and the hydraulic operating fluid tank 28 to thereby adjust driving (direction, position, speed, and so forth) of the hydraulic actuator 23, 24. In particular, the hydraulic actuator 23, 24 is driven at a speed proportional to the flow rate of hydraulic fluid that passes the meter-in passage 25*a*, 26*a* of the directional control valve 25, 26. The hydraulic fluid passing the bleed-off passage 25*b*, 26*b* of the directional control valve 25, 26 is returned to the hydraulic operating fluid tank 28 without being supplied to the hydraulic actuator 23, 24.

The first directional control valve 25 and the second directional control valve 26 are operated by a first operation device 41 and a second operation device 42, respectively. The first operation device 41 and the second operation device 42 issue, through an operation thereof by an operator, an instruction for an action of the first hydraulic actuator 23 and the second hydraulic actuator 24, respectively, and, for example, have operation levers 41*a* and 42*a* that are operated by the operator, respectively. The first operation device 41 and the second operation device 42 are configured in such a manner as to function as pressure reducing valves that decompress hydraulic fluid of the pilot pump 31 to generate operation pilot pressures according to the operation amounts. When the operation pilot pressure according to the operation amount generated by each operation device acts upon the spool of the directional control valve 25, 26, a spool stroke of the directional control valve 25, 26 according to the magnitude of the operation pilot pressure is generated.

A gate lock valve 32 is disposed on a hydraulic line that connects the pilot pump 31 and the first operation device 41 and the second operation device 42 to each other. The gate lock valve 32 validates or invalidates, through an operation thereof by the operator, an operation of the operation lever 41*a*, 42*a*, and has a gate lock lever 32*a* that is operated, for example, by the operator. If the gate lock valve 32 is operated to an unlock position, then the pilot pump 31 is connected to the first operation device 41 and the second operation device 42. Consequently, the first operation device 41 and the second operation device 42 can generate an operation pressure according to the operation of the operation lever 41*a*, 42*a*. On the other hand, if the gate lock lever 32*a* is operated to a lock position, then the pilot pump 31 is connected to the hydraulic operating fluid tank 28. Consequently, the operation pressure generated by the first operation device 41 and the second operation device 42 becomes zero irrespective of an operation of the operation lever 41*a*, 42*a*, and this disables an action of the directional control valve 25, 26. A switch position of the gate lock lever 32*a* is sensed by a sensor 55 that senses the position of the lever 32*a* or the pressure on a hydraulic line between the gate lock valve 32 and the first operation device 41 and the second operation device 42.

In a case where the operation lever 41*a*, 42*a* is neutral, that is, in a case where the operation amount of the operation lever 41*a*, 42*a* is zero, the spool stroke of the directional control valve 25, 26 is zero (the spool is at a neutral position). At this time, the bleed-off opening area of the directional control valve 25, 26 is in the maximum (bleed-off passage 25*b*, 26*b* is fully open) while the meter-in opening area of the directional control valve 25, 26 is zero (the meter-in passage 25*a*, 26*a* is fully closed). Therefore, hydraulic operating fluid delivered from the hydraulic pump 22 all returns to the hydraulic operating fluid tank 28, and the hydraulic actuator 23, 24 corresponding to the directional control valve 25, 26 does not act. At this time, the machine body controller 60 sends a signal for minimizing the pump displacement to the regulator 22*a* to minimize the flow rate of the hydraulic pump 22.

In a region in which the operation amount of the operation lever 41*a*, 42*a* is small, the spool stroke is also small according to the operation amount. According to the spool stroke (operation amount), while the bleed-off opening area decreases, the meter-in opening area increases. Consequently, while part of hydraulic fluid from the hydraulic pump 22 flows into the hydraulic actuator 23, 24 through the meter-in passage 25*a*, 26*a* of the directional control valve 25, 26, the remaining part of the hydraulic fluid returns to the hydraulic operating fluid tank 28 through the bleed-off passage 25*b*, 26*b*. At this time, the machine body controller 60 sends, to the regulator 22*a*, a command indicating a pump displacement according to the operation amount of the operation lever 41*a*, 42*a*, to thereby increase the flow rate of the hydraulic pump 22.

In a case where the operation amount of the operation lever 41*a*, 42*a* is in the maximum (in the case of a full operation), the spool stroke becomes maximum according to the maximum operation amount. At this time, while the bleed-off opening area is zero (the bleed-off passage 25*b*, 26*b* is fully closed), the meter-in opening area is in the maximum. Consequently, while the whole amount of the hydraulic fluid from the hydraulic pump 22 flows into the hydraulic actuator 23, 24 through the meter-in passage 25*a*, 26*a*, the flow rate of the hydraulic fluid to return to the hydraulic operating fluid tank 28 becomes zero.

The first hydraulic actuator 23 and the second hydraulic actuator 24 have a first displacement sensor 51 and a second displacement sensor 52 provided therein, respectively. The first displacement sensor 51 and the second displacement sensor 52 sense the displacement of the first hydraulic actuator 23 and the displacement of the second hydraulic actuator 24, respectively, and output sensing signals according to the sensed displacement of the first hydraulic actuator 23 and the sensed displacement of the second hydraulic actuator 24 to the machine body controller 60.

The operation pilot pressures generated by the first operation device 41 and the second operation device 42 are sensed by a first pressure sensor 53 and a second pressure sensor 54, respectively. The first pressure sensor 53 and the second pressure sensor 54 output sensing signals according to the sensed operation pilot pressures to the machine body controller 60. The first pressure sensor 53 and the second pressure sensor 54 function as operation amount sensors for sensing the operation amount of the first operation device 41 and the second operation device 42, respectively.

A revolution speed sensor 56 for sensing an actual revolution speed of the engine 21 is provided for the engine 21. The revolution speed sensor 56 outputs a sensing signal according to the sensed actual revolution speed to the engine controller 58.

The engine controller 58 is configured for mutual communication with the machine body controller 60. The engine controller 58 receives a target revolution speed of the engine 21 from the machine body controller 60 and transmits, to the machine body controller 60, an actual revolution speed of the engine 21 inputted from the revolution speed sensor 56. The engine controller 58 computes a command value for a fuel injection amount with which the actual revolution speed of the engine 21 sensed by the revolution speed sensor 56 coincides with the target revolution speed from the machine body controller 60, and outputs a command value of a result of the computation to the injection device 21*a*.

An engine control dial 43 is electrically connected to the machine body controller 60. The engine control dial 43 is for issuing an instruction of a set revolution speed of the engine 21 in response to an operation thereof by the operator, and outputs an instruction signal of the set revolution speed to the machine body controller 60.

The machine body controller 60 determines a target revolution speed of the engine 21 on the basis of the set revolution speed from the engine control dial 43, an operation of each of the operation devices 41 and 42, and so forth, and outputs the determined target revolution speed to the engine controller 58. In other words, the machine body controller 60 controls the revolution speed of the engine 21 via the engine controller 58. Further, the machine body controller 60 controls the delivery flow rate of the hydraulic pump 22 (pump delivery flow rate) according to a state of an operation for each of the first hydraulic actuator 23 and the second hydraulic actuator 24.

Figure 3:
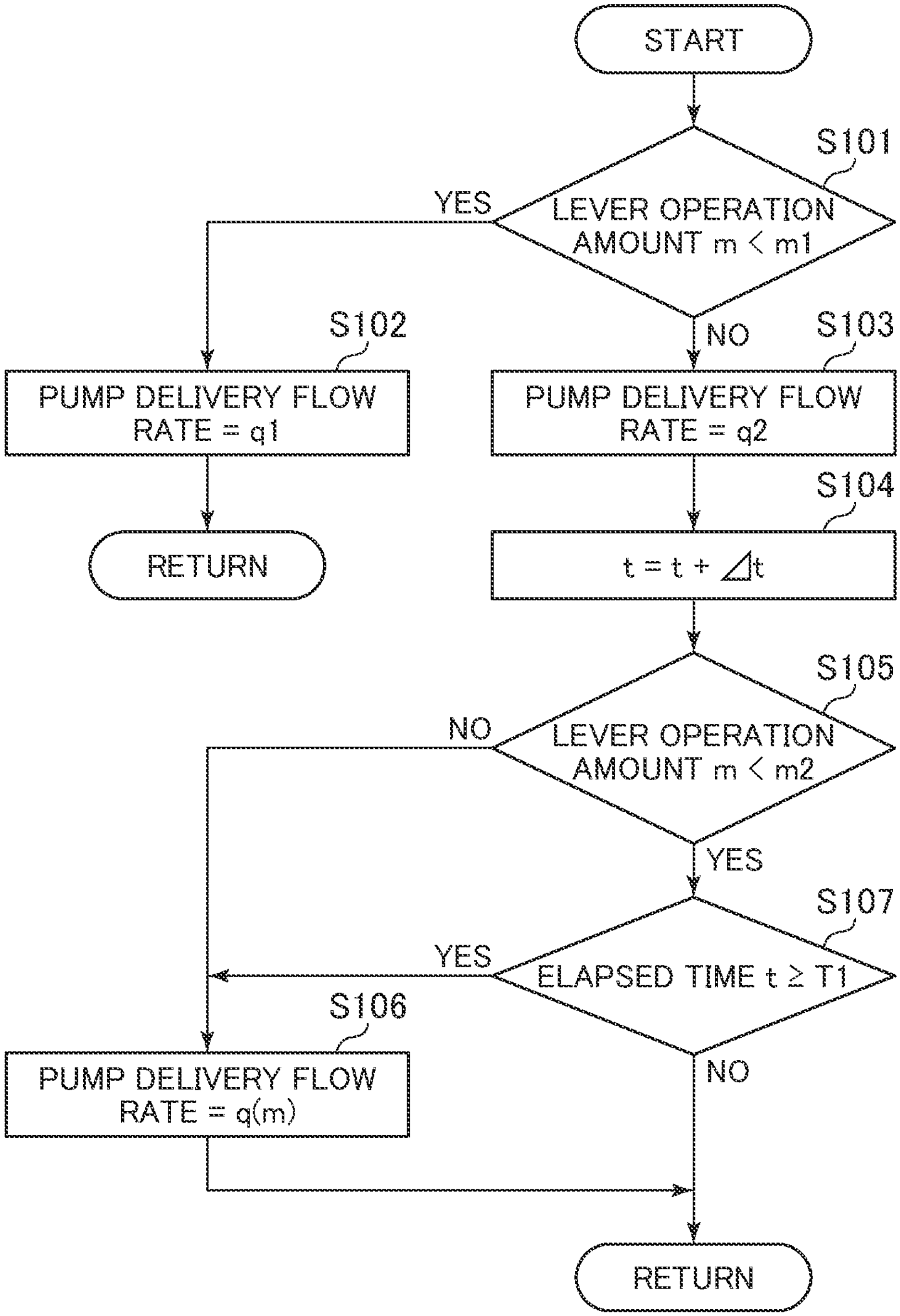
FIG. 3 is a flow chart depicting a control procedure for a hydraulic pump by a machine body controller in the first embodiment of the present invention.

Next, a control process of the machine body controller 60 in the present embodiment for the hydraulic pump 22 is described with reference to FIG. 3. FIG. 3 is a flow chart depicting the control process of the machine body controller 60 for the hydraulic pump 22.

The control process (steps from start to return) depicted in FIG. 3 is executed repeatedly, for example, in a predetermined control cycle Δt. The control process is started, for example, in response to an ON operation of a key switch (not depicted) for instruction of startup of the hydraulic excavator.

First, the machine body controller 60 decides whether or not a lever operation amount m of the operation lever 41*a*, 42*a* is smaller than a predetermined operation amount m1 (step S101). The predetermined operation amount m1 here is an operation amount sensed immediately before the hydraulic actuator 23, 24 starts to act, and is set, for example, to an operation amount when the meter-in passage 25*a*, 26*a* of the directional control valve 25, 26 is opened (hydraulic operating fluid starts to flow into the hydraulic actuator 23, 24).

In a case where a decision of YES (lever operation amount $m<m1$) is made in step S101, the machine body controller 60 controls the pump delivery flow rate to a minimum delivery flow rate q1. After execution of step S102, the machine body controller 60 returns the processing to start.

In a case where a decision of NO (lever operation amount $m \geq m1$) is made in step S101, the machine body controller 60 decides that the hydraulic actuator 23, 24 is in a state immediately before the hydraulic actuator 23, 24 starts to act, and controls the pump delivery flow rate to a predetermined delivery flow rate q2 that is greater than the minimum delivery flow rate q1 (step S103). In particular, the pressure sensor 53, 54 that senses an operation amount of the operation lever 41*a*, 42*a* configures a first timing sensor for sensing a first timing that is a timing immediately before the hydraulic actuator 23, 24 starts to act, and the machine body controller 60 decides, as the first timing, a timing at which the lever operation amount m becomes equal to or greater than the predetermined operation amount m1. After execution of step S103, the machine body controller 60 adds the control cycle $\Delta t$ to elapsed time t elapsed after step S103 is executed for the first time (step S104), and decides whether or not the lever operation amount m is smaller than a predetermined operation amount m2 (step S105). The predetermined operation amount m2 here is an operation amount sensed when the hydraulic actuator 23, 24 starts to act when the operation lever 41*a*, 42*a* is operated comparatively fast from its neutral position, and is set to a value greater than the predetermined operation amount m1 described hereinabove.

Figure 4:
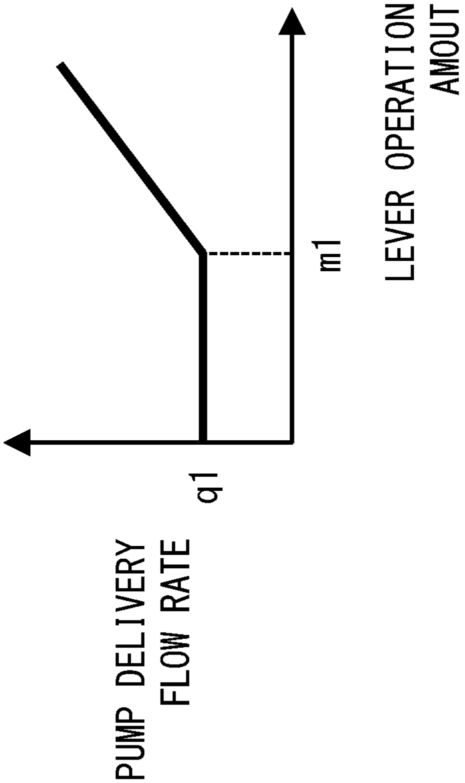
FIG. 4 is a diagram depicting a relation between the lever operation amount and the pump delivery flow rate.

When a decision of NO (lever operation amount m m2) is made in step S105, the machine body controller 60 decides that the hydraulic actuator 23, 24 is in a state immediately after the hydraulic actuator 23, 24 starts to act, and controls the pump delivery flow rate to a flow rate q(m) according to the lever operation amount m (step S106). In particular, the pressure sensor 53, 54 that senses the operation amount of the operation lever 41*a*, 42*a* configures a second timing sensor for sensing a second timing that is a timing immediately after the hydraulic actuator 23, 24 starts to act, and the machine body controller 60 decides, as the second timing, a timing at which the lever operation amount m becomes equal to or greater than the predetermined operation amount m2. Here, a relation between the lever operation amount and the pump delivery flow rate is depicted in FIG. 4. As depicted in FIG. 4, the pump delivery flow rate is the minimum delivery flow rate q1 when the lever operation amount is equal to or smaller than m1, and, after the lever operation amount exceeds m1, increases smoothly according to the lever operation amount. After execution of step S106, the machine body controller 60 returns the processing to start.

When a decision of YES (lever operation amount $m<m2$) is made in step S105, the machine body controller 60 decides whether or not the elapsed time t is equal to or longer than predetermined time T1 (step S107). When a decision of NO (elapsed time $t<T1$) is made in step S107, the machine body controller 60 returns the processing to start.

When a decision of YES (elapsed time $t \geq T1$) is made in step S107, the machine body controller 60 advances the processing to step S106. After execution of step S106, the controller 60 returns the processing to start. Consequently, even in a case where a long period of time elapses while the lever operation amount m does not reach the predetermined operation amount m2, the pump delivery flow rate decreases from the predetermined delivery flow rate q2 to the delivery flow rate q(m) according to the lever operation amount m, and therefore, such a situation that the hydraulic actuator 23, 24 moves more than necessary to degrade the operability can be prevented.

Figure 5:
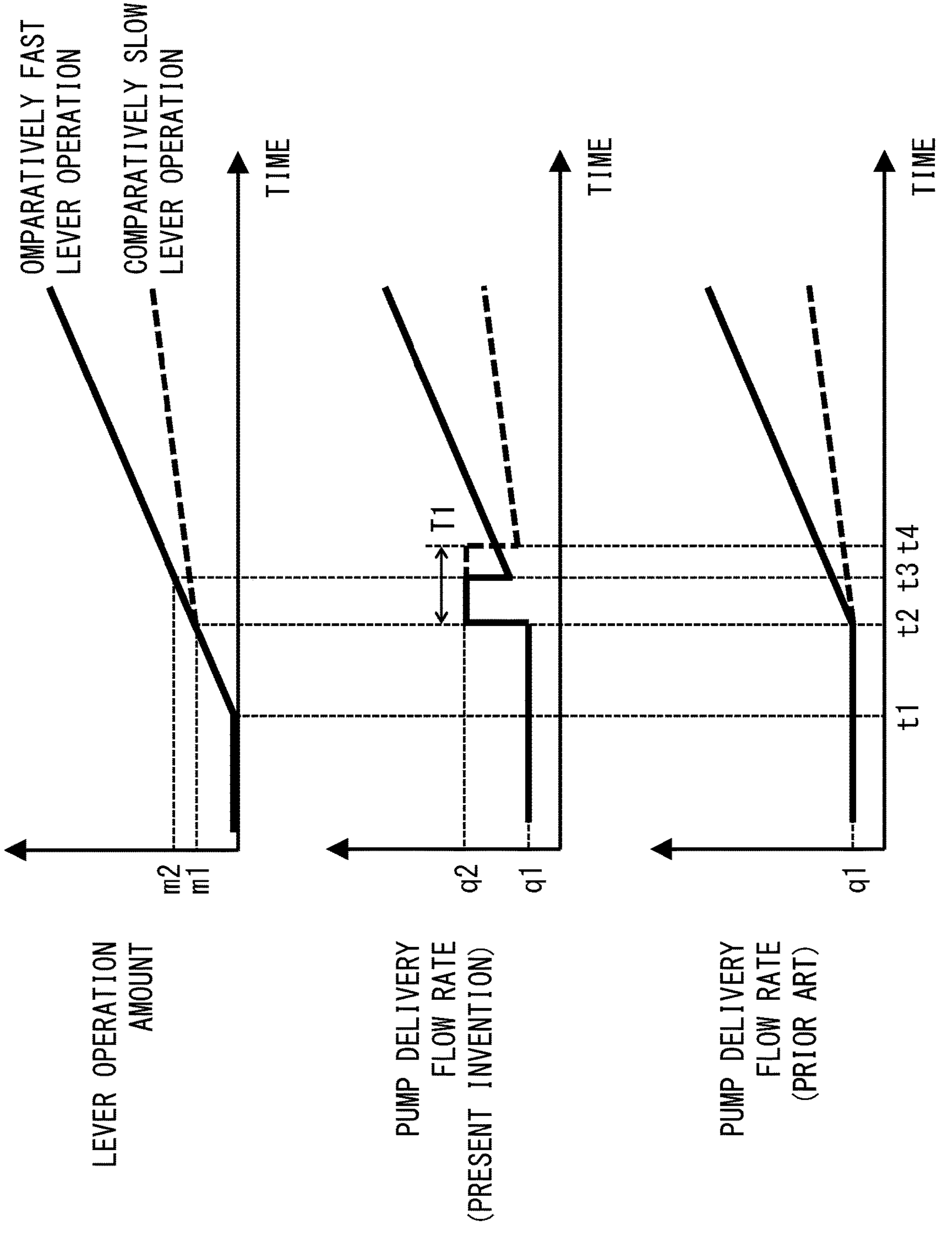
FIG. 5 is a diagram depicting a time variation of the pump delivery flow rate with respect to the lever operation amount at the start of an action of the hydraulic actuator in the first embodiment of the present invention, in comparison with that in a prior art.

FIG. 5 depicts a time variation of the operation amount (lever operation amount) of the operation lever 41*a*, 41*b* and the delivery flow rate of the hydraulic pump 22 (pump delivery flow rate) when the hydraulic actuator 23, 24 in the present embodiment starts to act, in comparison with that in a prior art. With reference to FIG. 5, a timing at which a lever operation is started is time t1, and a variation in a case where a comparatively fast lever operation is performed is represented by a solid line while a variation in a case where a comparatively slow lever operation is performed is indicated by a broken line.

In the prior art, while the lever operation amount remains smaller than the predetermined operation amount m1, the delivery flow rate of the hydraulic pump 22 (pump delivery flow rate) is the minimum delivery flow rate q1, and after the lever operation amount reaches the operation amount m1 (after time t2), the pump delivery flow rate increases smoothly according to the lever operation amount.

In contrast, in the present embodiment, if the lever operation amount reaches the predetermined operation amount m1, then the pump delivery flow rate increases to the predetermined delivery flow rate q2 that is greater than the minimum delivery flow rate q1. Thereafter, in a case where a comparatively fast lever operation is performed, the pump delivery flow rate decreases to a flow rate according to the lever operation amount at a timing (time t3) at which the lever operation amount reaches the predetermined operation amount m2. On the other hand, in a case where a comparatively slow lever operation is performed, the pump delivery flow rate decreases to a flow rate according to the lever operation amount at a timing (time t4) at which the elapsed time t from the timing (time t2) at which the pump delivery flow rate is increased to q2 reaches the predetermined time T1. In this manner, immediately before the hydraulic actuator 23, 24 starts to act and while static friction remains acting on a sliding portion of the hydraulic actuator 23, 24, the pump delivery flow rate is increased to the predetermined delivery flow rate q2 that is greater than the minimum delivery flow rate, and then, after the influence of the static friction disappears, by increasing the pump delivery flow rate according to the lever operation amount similarly as in the prior art, the start of movement of the hydraulic actuator 23, 24 becomes smooth. Except this, operability similar to that in the prior art can be implemented.

Figure 6:
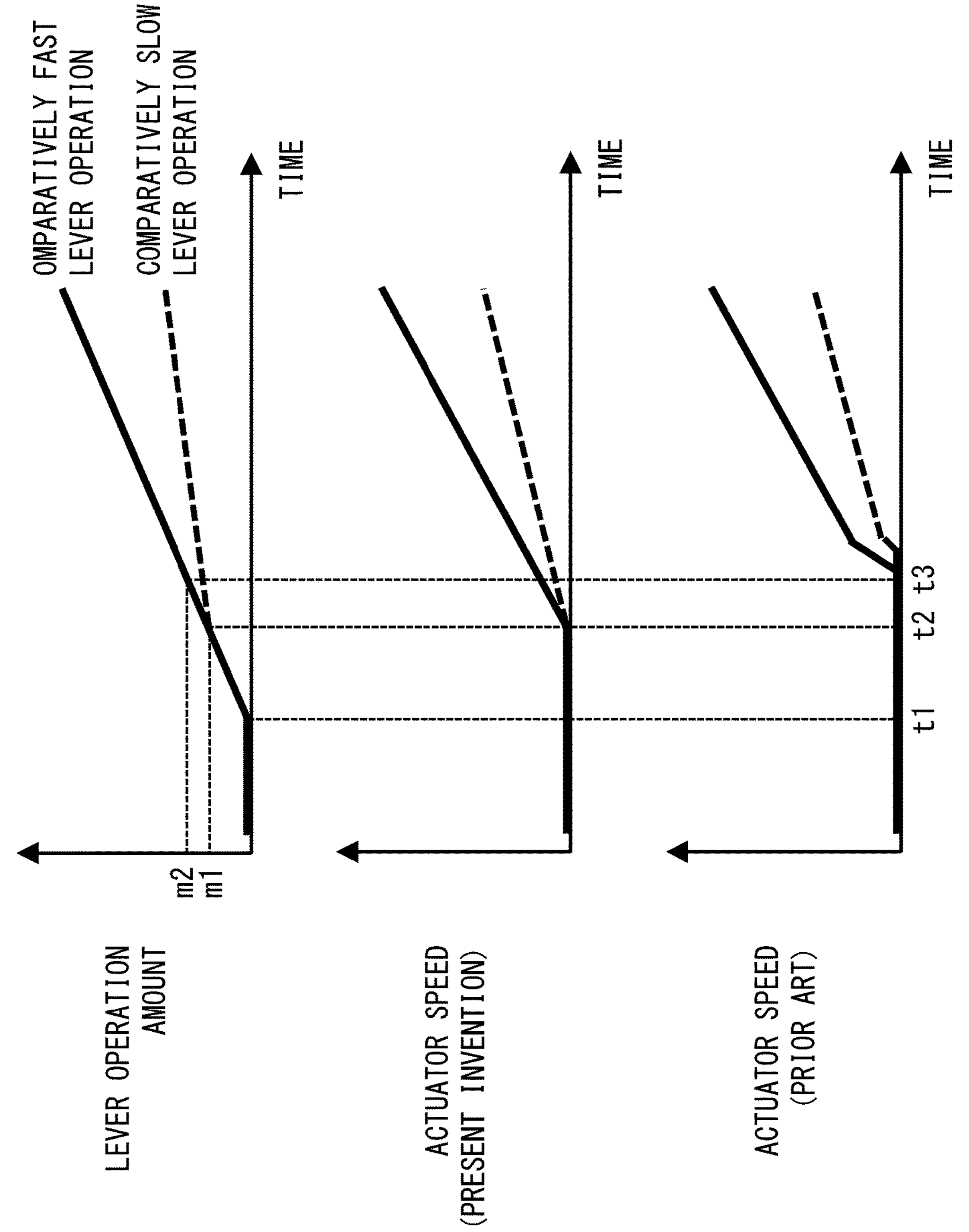
FIG. 6 is a diagram depicting a time variation of the lever operation amount and the actuator speed at the start of an action of the hydraulic actuator in the first embodiment of the present invention, in comparison with that in the prior art.
Figure 7:
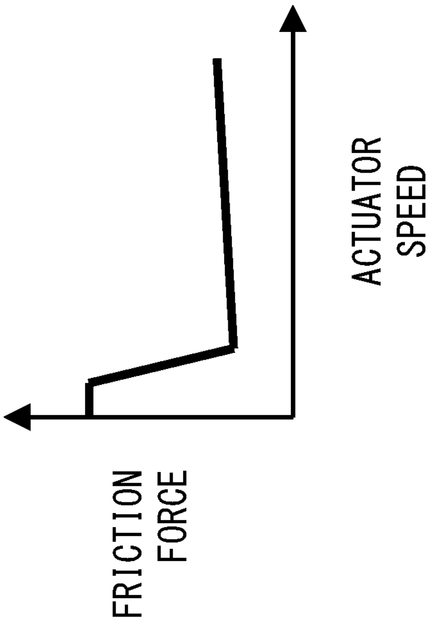
FIG. 7 is a diagram depicting a relation between the speed of the hydraulic actuator and the friction force generated at a sliding portion of the hydraulic actuator.

FIG. 6 depicts a time variation of the operation amount (lever operation amount) of the operation lever 41*a*, 42*a* and the speed of the hydraulic actuator 23, 24 (actuator speed) when the hydraulic actuator 23, 24 in the present embodiment starts to act, in comparison with that in the prior art. With the prior art, there is the possibility that a dispersion may occur with the timing of the start of movement or the speed rise of the hydraulic actuator 23, 24 with respect to an operation of the operation lever 41*a*, 42*a*. The reason is described with reference to FIG. 7. FIG. 7 is a diagram depicting a relation between the speed of the hydraulic actuator 23, 24 (actuator speed) and the friction force appearing at the sliding portion of the hydraulic actuator 23, 24. The friction force at the sliding portion is in the maximum in a standstill state (static friction) and decreases abruptly after the hydraulic actuator 23, 24 starts to act. Thereafter, when the speed increases further, the friction force at the sliding portion turns to increase moderately. When the hydraulic actuator 23, 24 starts to act comparatively steeply in a normal work, the hydraulic actuator 23, 24 acts in a region in which the friction force is comparatively low. However, if the thrust force is increased slowly by a fine operation, then the hydraulic actuator 23, 24 acts in a region in which the speed of the hydraulic actuator 23, 24 increases and the friction force varies abruptly. Therefore, the response of the hydraulic actuator 23, 24 is sometimes delayed with respect to the lever operation amount, and the speed rise sometimes becomes steep. As a result, a dispersion occurs with the timing at which the hydraulic actuator 23, 24 starts to act and with the speed rise, resulting in the possibility that operability in a fine operation may be impaired. In contrast, with the present embodiment, the timing at which the hydraulic actuator 23, 24 starts to act is fixed with respect to the operation amount of the operation lever 41*a*, 42*a* (lever operation amount), and besides the speed of the hydraulic actuator 23, 24 rises moderately according to the lever operation amount.

(Advantages)

In the present embodiment, the hydraulic excavator (work machine) includes the hydraulic pump 22 of the variable displacement type, the hydraulic actuator 23, 24 that is driven by hydraulic fluid supplied from the hydraulic pump 22, the operation lever 41*a*, 42*a* for issuing an instruction of an action of the hydraulic actuator 23, 24, and the controller 60 that controls the pump delivery flow rate that is the delivery flow rate of the hydraulic pump 22. The hydraulic excavator includes the first timing sensor 53, 54 for sensing the first timing that is a timing immediately before the hydraulic actuator 23, 24 starts to act and the second timing sensor 53, 54 for sensing the second timing that is a timing immediately after the hydraulic actuator 23, 24 starts to act. On the basis of a signal from the first timing sensor 53, 54 and a signal from the second timing sensor 53, 54, the controller 60 controls, before the first timing is sensed, the pump delivery flow rate to the minimum delivery flow rate q1, controls, after the first timing is sensed but before the second timing is sensed, the pump delivery flow rate to the predetermined delivery flow rate q2 that is greater than the minimum delivery flow rate q1, and controls, after the second timing is sensed, the pump delivery flow rate to the delivery flow rate according to the operation amount of the operation lever 41*a*, 42*a*.

With the present embodiment configured in such a manner as described above, during a period from a timing (first timing) immediately before the hydraulic actuator 23, 24 starts to act to a timing (second timing) immediately after the hydraulic actuator 23, 24 starts to act, the delivery flow rate of the hydraulic pump 22 (pump delivery flow rate) is controlled to the predetermined delivery flow rate q2 that is greater than the minimum delivery flow rate q1. Therefore, the thrust force when the hydraulic actuator 23, 24 starts to act rapidly surpasses the static friction force of the sliding portion of the hydraulic actuator 23, 24. Consequently, since the dispersion of the timing at which the hydraulic actuator 23, 24 starts to act or the rise of the speed is suppressed, it is possible to improve the operability when the hydraulic actuator 23, 24 starts to act in a fine operation in which the operation lever 41*a*, 42*a* is operated by a small amount.

Further, the first timing sensor in the present embodiment includes the sensor 53, 54 that senses the operation amount of the operation lever 41*a*, 42*a*, and the controller 60 decides, as the first timing, a timing at which the operation amount of the operation lever 41*a*, 42*a* sensed by the sensor 53, 54 becomes equal to or greater than a predetermined first operation amount m1. Consequently, it is possible to sense a timing (first timing) immediately before the hydraulic actuator 23, 24 starts to act, on the basis of the operation amount of the operation lever 41*a*, 42*a*.

Further, the second timing sensor in the present embodiment includes the sensor 53, 54 that senses the operation amount of the operation lever 41*a*, 42*a*, and the controller 60 decides, as the second timing, an earlier one of a timing at which the operation amount of the operation lever 41*a*, 42*a* sensed by the sensor 53, 54 becomes equal to or greater than a predetermined second operation amount m2 that is greater than the first operation amount m1 and a timing at which the elapsed time t after the operation amount of the operation lever 41*a*, 42*a* becomes equal to or greater than the first operation amount m1 becomes equal to or longer than predetermined time T1. Consequently, in both a case in which a comparatively fast lever operation is performed and another case in which a comparatively slow lever operation is performed, it becomes possible to appropriately sense a timing (second timing) immediately after the hydraulic actuator 23, 24 starts to act.

Embodiment 2

A hydraulic excavator according to a second embodiment of the present invention is described focusing on differences from that of the first embodiment.

The machine body controller 60 in the first embodiment decides a timing at which the lever operation amount becomes equal to or greater than the predetermined operation amount m2, as the timing (second timing) immediately after the hydraulic actuator 23, 24 starts to act. However, it is not easy to accurately decide a timing (second timing) immediately after the hydraulic actuator 23, 24 starts to act, on the basis of the lever operation amount. Therefore, in a case where the second timing is sensed earlier than a timing at which the hydraulic actuator 23, 24 actually starts to act, there is the possibility that delay may occur with the timing at which the hydraulic actuator 23, 24 starts to act, because of shortage of the pump delivery flow rate. On the contrary, in a case where the second timing is sensed late, there is the possibility that the pump delivery flow rate may become excessively great and the rise of the speed of the hydraulic actuator 23, 24 may become steep. The present embodiment solves this problem.

Figure 8:
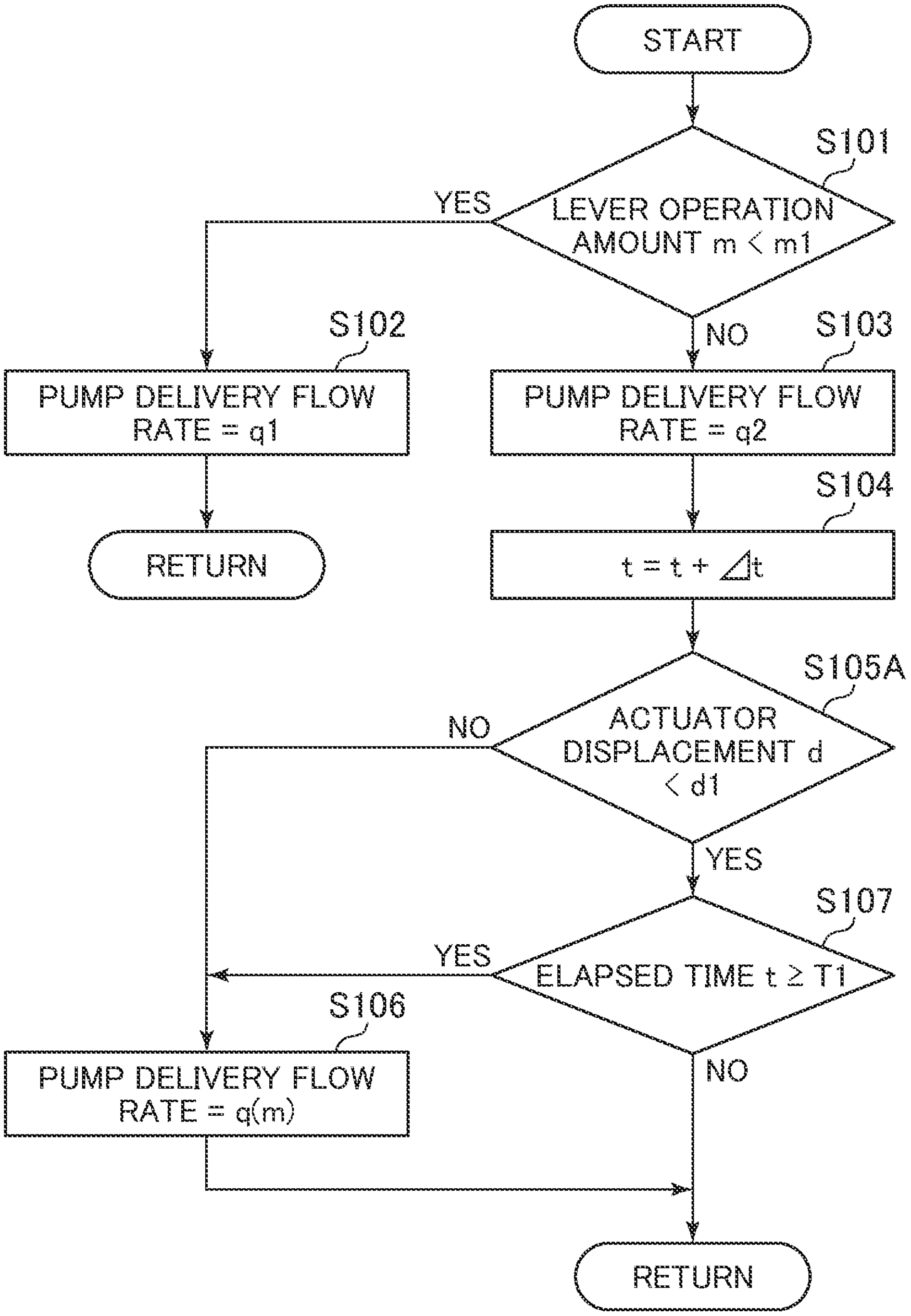
FIG. 8 is a flow chart depicting a control procedure for a hydraulic pump by a machine body controller in a second embodiment of the present invention.

FIG. 8 is a flow chart depicting pump control by the machine body controller 60 in the present embodiment. In the following, differences from the pump control by the machine body controller 60 in the first embodiment are described.

The machine body controller 60 in the present embodiment decides whether or not an actuator displacement d is smaller than a predetermined displacement d1 (step S105A), in place of step S105 (refer to FIG. 3) in the first embodiment. The predetermined displacement d1 here is preferably set to a minimum value of the actuator displacement with which it can be regarded that the hydraulic actuator 23, 24 starts to act. When a decision of YES (actuator displacement $d<d1$) is made in step S105, the machine body controller 60 advances the processing to step S107, but when a decision of NO (actuator displacement $d\geq d1$) is made, the machine body controller 60 advances the processing to step S106. In particular, the displacement sensor 51, 52 configures a second timing sensor for sensing the second timing that is a timing immediately after the hydraulic actuator 23, 24 starts to act, and the machine body controller 60 decides, as the second timing, a timing at which the actuator displacement d becomes equal to or greater than the predetermined displacement d1.

Figure 9:
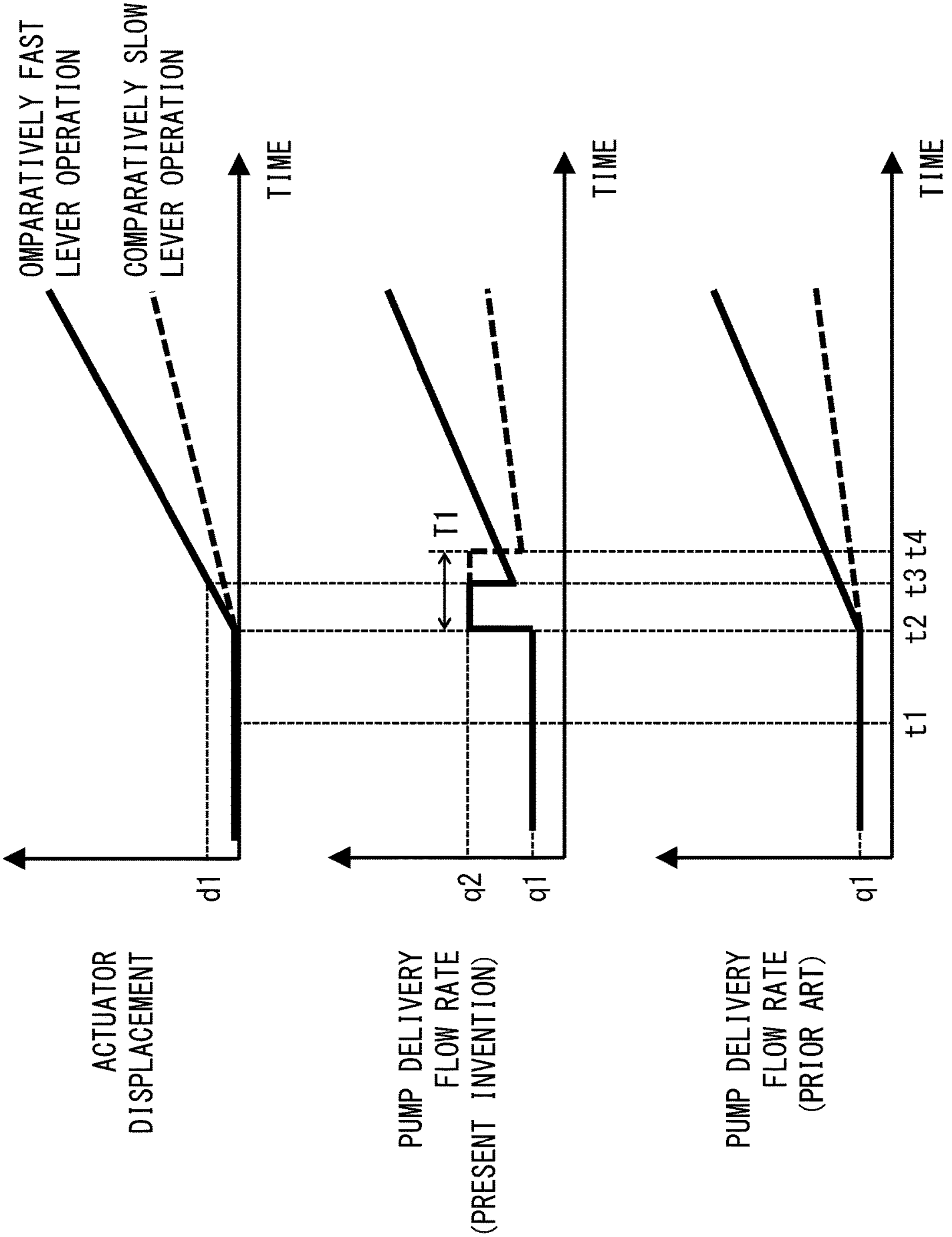
FIG. 9 is a diagram depicting a time variation of the actuator displacement and the pump delivery flow rate at the start of an action of a hydraulic actuator in the second embodiment of the present invention, in comparison with that in the prior art.

FIG. 9 is a diagram depicting a time variation of the actuator displacement and the pump delivery flow rate when the hydraulic actuator 23, 24 in the present embodiment starts to act, in comparison with that in the prior art. Although, in the first embodiment (refer to FIG. 5), the pump delivery flow rate decreases from the flow rate q2 to the flow rate q(m) according to the lever operation amount m at a timing at which the lever operation amount reaches the predetermined value m2, in the present embodiment, the pump delivery flow rate decreases from the flow rate q2 to the flow rate q(m) according to the lever operation amount m at a timing (time t3) at which the actuator displacement reaches d1.

(Advantages)

The hydraulic excavator according to the present embodiment includes, as the second timing sensor, the displacement sensor 51, 52 that measures the displacement of the hydraulic actuator 23, 24, and the controller 60 decides, as the second timing (timing immediately after the hydraulic actuator 23, 24 starts to act), a timing at which the displacement d of the hydraulic actuator 23, 24 measured by the displacement sensor 51, 52 becomes equal to or greater than the predetermined displacement d1.

Also in the present embodiment configured in such a manner as described above, advantages similar to those by the first embodiment can be achieved. Further, since start of movement of the hydraulic actuator 23, 24 is sensed on the basis of the displacement d of the hydraulic actuator 23, 24, the sensing accuracy of a timing (second timing) immediately after the hydraulic actuator 23, 24 starts to act can be improved.

Embodiment 3

A hydraulic excavator according to a third embodiment of the present invention is described focusing on differences from that of the first embodiment.

The machine body controller 60 in the first embodiment decides a timing at which the lever operation amount becomes equal to or greater than the predetermined operation amount m1, as a timing (first timing) immediately before the hydraulic actuator 23, 24 starts to act. However, the lever operation amount when hydraulic operating fluid starts to flow into the hydraulic actuator 23, 24 has a dispersion depending upon the machine body. Therefore, in a case where the first timing is sensed later than a timing at which hydraulic operating fluid actually starts to flow into the hydraulic actuator 23, 24, there is the possibility that the timing at which the hydraulic actuator 23, 24 starts to act may be delayed because of shortage of the pump delivery flow rate. The present embodiment solves this problem.

Figure 10:
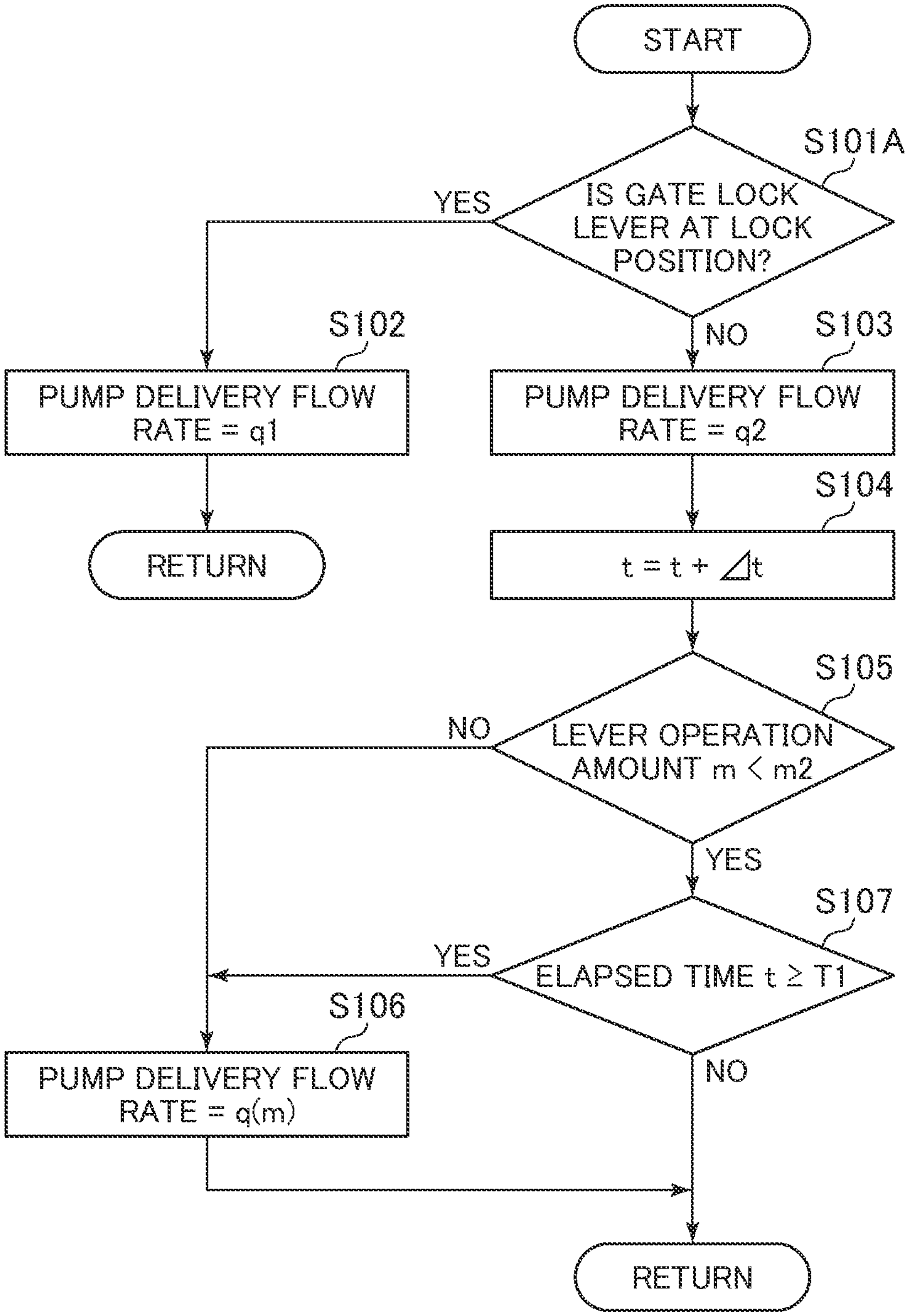
FIG. 10 is a flow chart depicting a control procedure for a hydraulic pump by a machine body controller in a third embodiment of the present invention.

FIG. 10 is a flow chart depicting pump control by the machine body controller 60 in the present embodiment. In the following, differences from the pump control by the machine body controller 60 in the first embodiment are described.

The machine body controller 60 in the present embodiment decides whether or not the gate lock lever 32*a* is in a lock position (step S101A), in place of step S101 (refer to FIG. 3) in the first embodiment. When a decision of YES (the gate lock lever 32*a* is in its lock position) is made in step S101A, the machine body controller 60 advances the processing to step S102, but when a decision of NO (the gate lock lever 32*a* is in its unlock position) is made, the machine body controller 60 advances the processing to step S103. In particular, the sensor 55 that senses the switch position of the gate lock lever 32*a* configures a first timing sensor for sensing the first timing that is a timing immediately before the hydraulic actuator 23, 24 starts to act, and the machine body controller 60 decides, as the first timing, a timing at which the gate lock lever 32*a* is operated to the unlock position.

Figure 11:
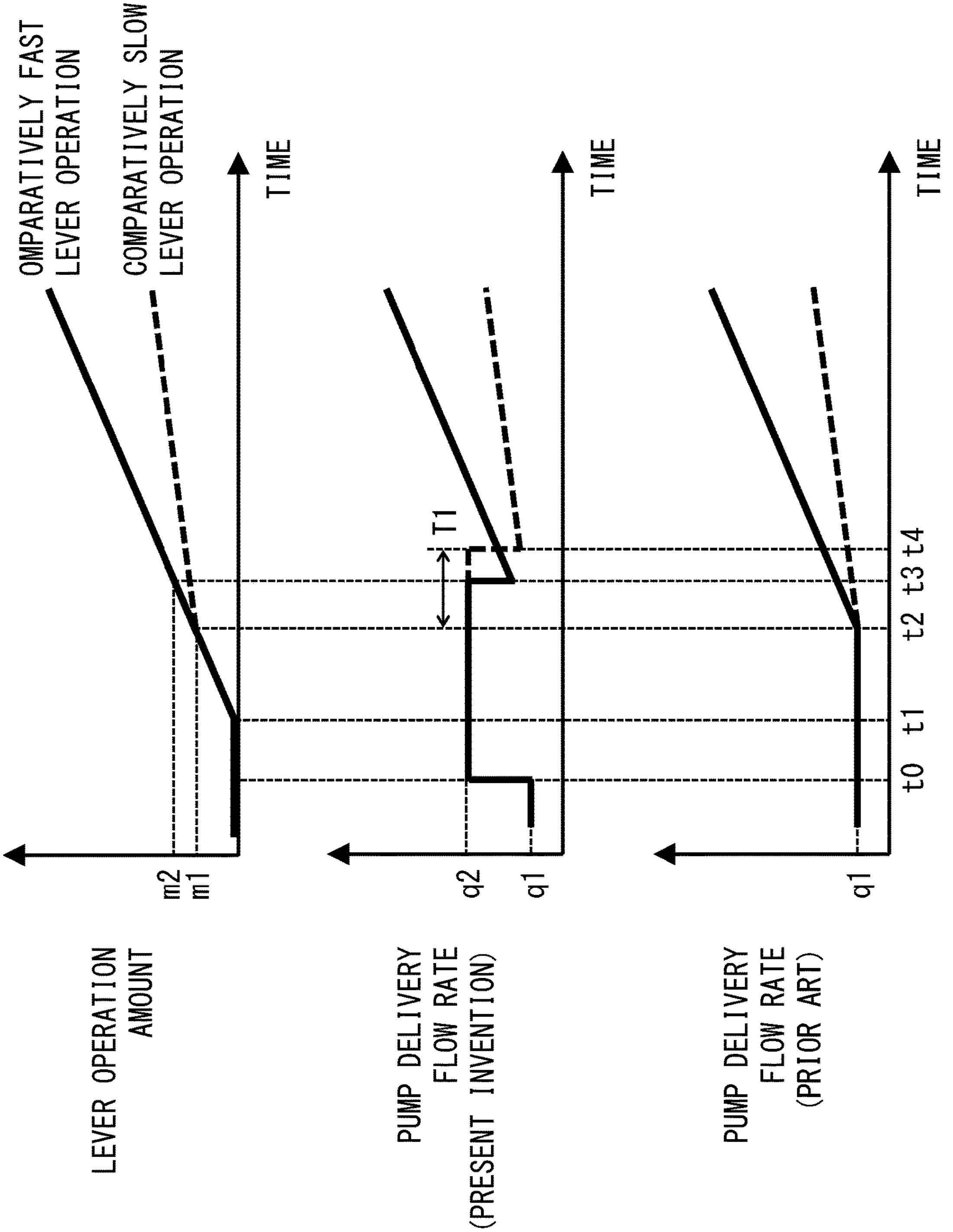
FIG. 11 is a diagram depicting a time variation of the lever operation amount and the pump delivery flow rate at the start of an action of a hydraulic actuator in the third embodiment of the present invention, in comparison with that in the prior art.

FIG. 11 is a diagram depicting a time variation of the lever operation amount and the pump delivery flow rate when the hydraulic actuator 23, 24 in the present embodiment starts to act, in comparison with that in the prior art. Although, in the first embodiment (refer to FIG. 5), the pump delivery flow rate increases from the minimum delivery flow rate q1 to the predetermined delivery flow rate q2 at a timing (time t2) at which the lever operation amount becomes equal to or greater than the predetermined operation amount m1, in the present embodiment, the pump delivery flow rate increases from the minimum delivery flow rate q1 to the predetermined delivery flow rate q2 at a timing (time t0) at which the gate lock lever 32*a* is operated to its unlock position.

(Advantages)

In the present embodiment, the hydraulic excavator includes the gate lock lever 32*a* that allows the switching operation between the lock position at which an action of the hydraulic actuator 23, 24 is disabled and the unlock position at which an action of the hydraulic actuator 23, 24 is enabled, and the first timing sensor is the sensor 55 that senses the lock position and the unlock position of the gate lock lever 32*a*. Further, the controller 60 decides, as the first timing (timing immediately before the hydraulic actuator 23, 24 starts to act), a timing at which the position of the gate lock lever 32*a* sensed by the sensor 55 changes from the lock position to the unlock position.

Also with the present embodiment configured in such a manner as described above, advantages similar to those by the first embodiment can be achieved. Further, since the delivery flow rate of the hydraulic pump 22 (pump delivery flow rate) is controlled to the predetermined delivery flow rate q2 at a timing at which the gate lock lever 32*a* is operated to the unlock position (timing at which the operator starts a work), the pump delivery flow rate can be increased to the predetermined delivery flow rate q2 with certainty before hydraulic operating fluid starts to flow into the hydraulic actuator 23, 24. Consequently, it can be prevented that some delay occurs, because of shortage of the pump delivery flow rate, with the timing at which the hydraulic actuator 23, 24 starts to act.

Although the embodiments of the present invention have been described in detail, the present invention is not limited to the embodiments described above but includes various modifications. For example, the embodiments described above have been explained in detail in order to explain the present invention in a way easy to understand and are not necessarily restricted to those that include all configurations described above. Further, it is also possible to add part of the configuration of a certain embodiment to the configuration of a different embodiment, and it is also possible to delete part of the configuration of a certain embodiment or to replace part of the configuration of a certain embodiment with part of a different embodiment.

DESCRIPTION OF REFERENCE CHARACTERS

1: Front device
2: Machine body
3: Lower track structure

4: Upper swing structure
5: Boom
6: Arm
7: Bucket
8: Boom cylinder
9: Arm cylinder
10: Bucket cylinder
11: Track device
11*a*: Track hydraulic motor
12: Cab
13: Counterweight
14: Machine room
20: Hydraulic system
21: Engine
21*a*: Injection device
22: Hydraulic pump
22*a*: Regulator
23: First hydraulic actuator
24: Second hydraulic actuator
25: First directional control valve
25*a*: Meter-in passage
25*b*: Bleed-off passage
26: Second directional control valve
26*a*: Meter-in passage
26*b*: Bleed-off passage
28: Hydraulic operating fluid tank
31: Pilot pump
32: Gate lock valve
32*a*: Gate lock lever
41: First operation device
41*a*: Operation lever
42: Second operation device
42*a*: Operation lever
43: Engine control dial
51: First displacement sensor (second timing sensor)
52: Second displacement sensor (second timing sensor)
53: First pressure sensor (first timing sensor, second timing sensor)
54: Second pressure sensor (first timing sensor, second timing sensor)
55: Sensor (first timing sensor)
56: Revolution speed sensor
58: Engine controller
60: Machine body controller

The invention claimed is:

1. A work machine that includes
a hydraulic pump of a variable displacement type,
a hydraulic actuator driven by hydraulic fluid supplied from the hydraulic pump,
an operation lever for issuing an instruction of an action of the hydraulic actuator, and
a controller that controls a pump delivery flow rate that is a delivery flow rate of the hydraulic pump,
the work machine comprising:
a first timing sensor for sensing a first timing that is a timing immediately before the hydraulic actuator starts to act; and
a second timing sensor for sensing a second timing that is a timing immediately after the hydraulic actuator starts to act, wherein
the controller,
on a basis of a signal from the first timing sensor and
a signal from the second timing sensor,
controls, before the first timing is sensed, the pump delivery flow rate to a minimum delivery flow rate,
control, after the first timing is sensed but before the second timing is sensed, the pump delivery flow rate to a predetermined delivery flow rate that is greater than the minimum delivery flow rate, and
control, after the second timing is sensed, the pump delivery flow rate to a delivery flow rate according to an operation amount of the operation lever,
each one of the first timing sensor and the second timing sensor is a sensor that senses an operation amount of the operation lever, and
the controller is configured to
decide, as the first timing, a timing at which the operation amount of the operation lever sensed by the sensor becomes equal to or greater than a predetermined first operation amount, and
decide, as the second timing, an earlier one of a timing at which the operation amount of the operation lever sensed by the sensor becomes equal to or greater than a predetermined second operation amount that is greater than the first operation amount and a timing at which elapsed time after the operation amount of the operation lever becomes equal to or greater than the first operation amount becomes equal to or greater than predetermined time.

2. A work machine that includes
a hydraulic pump of a variable displacement type,
a hydraulic actuator driven by hydraulic fluid supplied from the hydraulic pump,
an operation lever for issuing an instruction of an action of the hydraulic actuator, and
a controller that controls a pump delivery flow rate that is a delivery flow rate of the hydraulic pump,
the work machine comprising:
a first timing sensor for sensing a first timing that is a timing immediately before the hydraulic actuator starts to act; and
a second timing sensor for sensing a second timing that is a timing immediately after the hydraulic actuator starts to act, wherein
the controller,
on a basis of a signal from the first timing sensor and
a signal from the second timing sensor,
controls, before the first timing is sensed, the pump delivery flow rate to a minimum delivery flow rate,
control, after the first timing is sensed but before the second timing is sensed, the pump delivery flow rate to a predetermined delivery flow rate that is greater than the minimum delivery flow rate, and
control, after the second timing is sensed, the pump delivery flow rate to a delivery flow rate according to an operation amount of the operation lever,
the work machine includes a gate lock lever that allows a switching operation thereof between a lock position at which the gate lock lever disables an action of the hydraulic actuator and an unlock position at which the gate lock lever enables an action of the hydraulic actuator,
the first timing sensor is a sensor that senses the lock position and the unlock position of the gate lock lever, and
the controller is configured to decide, as the first timing, a timing at which a position of the gate lock lever sensed by the sensor changes from the lock position to the unlock position.

3. A work machine that includes
a hydraulic pump of a variable displacement type,
a hydraulic actuator driven by hydraulic fluid supplied from the hydraulic pump, an operation lever for issuing an instruction of an action of the hydraulic actuator, and a controller that controls a pump delivery flow rate that is a delivery flow rate of the hydraulic pump, the work machine comprising:

a first timing sensor for sensing a first timing that is a timing immediately before the hydraulic actuator starts to act; and a second timing sensor for sensing a second timing that is a timing immediately after the hydraulic actuator starts to act, wherein the controller, on a basis of a signal from the first timing sensor and a signal from the second timing sensor, controls, before the first timing is sensed, the pump delivery flow rate to a minimum delivery flow rate, control, after the first timing is sensed but before the second timing is sensed, the pump delivery flow rate to a predetermined delivery flow rate that is greater than the minimum delivery flow rate, and control, after the second timing is sensed, the pump delivery flow rate to a delivery flow rate according to an operation amount of the operation lever, the second timing sensor is a displacement sensor that measures a displacement of the hydraulic actuator, and the controller is configured to decide, as the second timing, a timing at which the displacement of the hydraulic actuator measured by the displacement sensor becomes equal to or greater than a predetermined displacement.

* * * * *